(12) United States Patent
Qian

(10) Patent No.: US 10,567,563 B2
(45) Date of Patent: Feb. 18, 2020

(54) HOUSING ASSEMBLY, MOBILE TERMINAL, AND METHOD FOR ASSEMBLING HOUSING ASSEMBLY

(71) Applicant: Huawei Technologies Co., Ltd., Shenzhen (CN)

(72) Inventor: Zaijun Qian, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/473,528

(22) PCT Filed: Mar. 30, 2017

(86) PCT No.: PCT/CN2017/078828
§ 371 (c)(1),
(2) Date: Jun. 25, 2019

(87) PCT Pub. No.: WO2018/120478
PCT Pub. Date: Jul. 5, 2018

(65) Prior Publication Data
US 2019/0335029 A1    Oct. 31, 2019

(30) Foreign Application Priority Data

Dec. 26, 2016  (CN) .......................... 2016 1 1220188

(51) Int. Cl.
*H04M 1/00*  (2006.01)
*H04M 1/02*  (2006.01)

(52) U.S. Cl.
CPC ......... *H04M 1/0283* (2013.01); *H04M 1/026* (2013.01); *H04M 1/0249* (2013.01); *H04M 2001/0204* (2013.01)

(58) Field of Classification Search
CPC .. H04M 1/00; H04M 1/26; G02B 7/04; H01R 13/72; G06F 1/1637

(Continued)

(56) References Cited

U.S. PATENT DOCUMENTS 9,407,048 B2 * 8/2016 George ................. H01R 13/72
2012/0194998 A1  8/2012 McClure et al.
(Continued)

FOREIGN PATENT DOCUMENTS

CN    104660750 A    5/2015
CN    204761495 U   11/2015
(Continued)

OTHER PUBLICATIONS

Machine Translation and Abstract of Chinese Publication No. CN104660750, May 27, 2015, 12 pages.
(Continued)

*Primary Examiner* — William D Cumming
(74) *Attorney, Agent, or Firm* — Conley Rose, P.C.

(57) ABSTRACT

A housing assembly includes a frame body, an adhesive, a cover plate, and a decorative ring. A bearing surface and a limiting surface are disposed on an inner side of the frame body. The cover plate includes a top surface and a bottom surface that are oppositely disposed and a side surface surroundingly connected between the top surface and the bottom surface, and the side surface includes a first side surface connected to the top surface and a second side surface connected to the bottom surface. The cover plate is installed to the inner side of the frame body. The adhesive is disposed between the bottom surface and the bearing surface and between the second side surface and the limiting surface. Accommodating space is provided between the first side surface and the limiting surface. The decorative ring is disposed in the accommodating space and covers the bearing surface.

20 Claims, 13 Drawing Sheets

(58) Field of Classification Search
USPC .................................................. 455/575.1
See application file for complete search history.

(56) References Cited

U.S. PATENT DOCUMENTS

| | | |
|---|---|---|
| 2013/0318766 A1 | 12/2013 | Kiple et al. |
| 2013/0329173 A1 | 12/2013 | Jung |
| 2016/0043514 A1* | 2/2016 | George ............... H01R 13/72 439/501 |
| 2016/0301444 A1* | 10/2016 | George ............... H01R 13/72 |
| 2018/0335601 A1* | 11/2018 | Hu ......................... G02B 7/04 |
| 2018/0335602 A1* | 11/2018 | Hu ......................... G02B 7/04 |
| 2018/0335603 A1* | 11/2018 | Hu ......................... G02B 7/04 |
| 2018/0338069 A1* | 11/2018 | Hu ...................... H04N 5/2252 |
| 2018/0372988 A1* | 12/2018 | Hu .................... H02K 41/0356 |
| 2019/0155340 A1 | 5/2019 | Tang et al. |

FOREIGN PATENT DOCUMENTS

| | | |
|---|---|---|
| CN | 105116967 A | 12/2015 |
| CN | 105227715 A | 1/2016 |
| CN | 105282274 A | 1/2016 |
| CN | 205029720 U | 2/2016 |
| CN | 205105263 U | 3/2016 |
| CN | 205545441 U | 8/2016 |
| CN | 106095195 A | 11/2016 |
| CN | 106095197 A | 11/2016 |
| JP | 2007187858 A | 7/2007 |
| JP | 2014077821 A | 5/2014 |
| JP | 2015197784 A | 11/2015 |
| WO | WO-2018126815 A1 * | 7/2018 ........... G06F 1/1637 |

OTHER PUBLICATIONS

Machine Translation and Abstract of Chinese Publication No. CN105227715, Jan. 6, 2016, 19 pages.
Machine Translation and Abstract of Chinese Publication No. CN105282274, Jan. 27, 2016, 11 pages.
Machine Translation and Abstract of Chinese Publication No. CN106095195, Nov. 9, 2016, 21 pages.
Machine Translation and Abstract of Chinese Publication No. CN106095197, Nov. 9, 2016, 21 pages.
Machine Translation and Abstract of Chinese Publication No. CN204761495, Nov. 11, 2015, 5 pages.
Machine Translation and Abstract of Chinese Publication No. CN205029720, Feb. 10, 2016, 16 pages.
Machine Translation and Abstract of Chinese Publication No. CN205105263, Mar. 23, 2016, 17 pages.
Machine Translation and Abstract of Chinese Publication No. CN205545441, Aug. 31, 2016, 6 pages.
Machine Translation and Abstract of Japanese Publication No. JP2007187858, Jul. 26, 2007, 18 pages.
Machine Translation and Abstract of Japanese Publication No. JP2014077821, May 1, 2014, 14 pages.
Machine Translation and Abstract of Japanese Publication No. JP2015197784, Nov. 9, 2015, 15 pages.
Foreign Communication From a Counterpart Application, Chinese Application No. 201780004962.6, Chinese Office Action dated Sep. 3, 2019, 6 pages.
Foreign Communication From a Counterpart Application, PCT Application No. PCT/CN2017/078828, English Translation of International Search Report dated Sep. 29, 2017, 2 pages.
Foreign Communication From a Counterpart Application, PCT Application No. PCT/CN2017/078828, English Translation of Written Opinion dated Sep. 29, 2017, 3 pages.
Foreign Communication From a Counterpart Application, European Application No. 17887050.7, Extended European Search Report dated Sep. 13, 2019, 11 pages.

* cited by examiner

HOUSING ASSEMBLY, MOBILE TERMINAL, AND METHOD FOR ASSEMBLING HOUSING ASSEMBLY

CROSS-REFERENCE TO RELATED APPLICATIONS

This application is a National Stage application of International Application No. PCT/CN2017/078828, filed on Mar. 30, 2017, which claims priority to Chinese Patent Application No. 201611220188.6, filed on Dec. 26, 2016. Both of the aforementioned applications are hereby incorporated by reference in their entireties.

TECHNICAL FIELD

This application relates to the field of communications devices, and in particular, to a housing assembly, a mobile terminal, and a method for assembling a housing assembly.

BACKGROUND

At present, during assembly of a touchscreen in a mobile phone, the touchscreen is usually first attached to a cover glass, and then the cover glass is bonded to a bezel of the mobile phone. A step surface is usually disposed on an inner side of the bezel, and edges of a lower surface of the cover glass are bonded to the step surface by using an adhesive. To ensure a bonding force between the cover glass and the bezel, a relatively wide step surface is generally disposed. As a result, the bezel of the mobile phone is wide. In addition, when the cover glass is press-fitted to the step surface, such a structure causes the adhesive to be pressed from the step surface to a clearance between the side surface of the cover glass and the bezel, and the adhesive is even overflowed from the clearance to an upper surface of the cover glass. In this case, when a user uses the mobile phone, the adhesive is easily seen, resulting in a poor decorative appearance of the mobile phone.

SUMMARY

A technical problem to be resolved in embodiments of this application is to provide a housing assembly with a narrow bezel and a favorable appearance, a mobile terminal, and a method for assembling a housing assembly.

To achieve the foregoing objective, the following technical solutions are used in implementations of this application.

According to a first aspect, an embodiment of this application provides a housing assembly that can be applied to a mobile terminal. The housing assembly includes a frame body, an adhesive, a cover plate, and a decorative ring. A bearing surface and a limiting surface are disposed on an inner side of the frame body. The cover plate includes a top surface and a bottom surface that are oppositely disposed and a side surface surroundingly connected between the top surface and the bottom surface. The side surface includes a first side surface connected to the top surface and a second side surface connected to the bottom surface. The cover plate is installed to the inner side of the frame body. The adhesive is disposed between the bottom surface and the bearing surface and between the second side surface and the limiting surface. Accommodating space is provided between the first side surface and the limiting surface. The decorative ring is disposed in the accommodating space and covers the bearing surface.

In this implementation, the cover plate is bonded to the bearing surface by using the bottom surface and is bonded to the limiting surface by using the second side surface. Therefore, compared with the prior art, a bonding area between the cover plate and the frame body is increased in the housing assembly, so that the housing assembly has sufficient reliability in a roller test and a drop test. In a case of ensuring that there is an adequate bonding force between the cover plate and the frame body, the housing assembly may be provided with the relatively narrow bearing surface, so that the housing assembly presents a narrow bezel visual effect. In addition, the decorative ring covers the bearing surface, and therefore the decorative ring also covers the adhesive. When a user uses the mobile terminal, only the frame body and the decorative ring can be seen from an appearance, and the bearing surface and the adhesive are not seen. Therefore, the housing assembly has a favorable decorative appearance. In short, the housing assembly has a narrow bezel and a favorable appearance, and the mobile terminal to which the housing assembly is applied has a narrow bezel and a favorable appearance.

Because a clearance between the second side surface and the limiting surface is filled by the adhesive, there is no clearance between the cover plate and the frame body, and the housing assembly is capable of water proofing and dust proofing. In a direction parallel to the bottom surface, the cover plate and the frame body (that is, the second side surface and the limiting surface) connected by using the adhesive, and a hard-soft-hard connection is formed between the cover plate and the frame body. Therefore, when the mobile terminal suffers a collision or is pressed, the adhesive can function as a cushion to reduce a risk of breaking the cover plate.

Optionally, the housing assembly further includes a rear cover. The rear cover and the frame body are integrated, or form an integrated structure in an assembly manner (bonding, buckle connection, threaded connection, and the like). The frame body and the rear cover jointly form an enclosure of the mobile terminal.

A positioning surface is further disposed on the inner side of the frame body. The housing assembly further includes a middle plate, where middle plate is installed to the inner side of the frame body and is abutted against the positioning surface. The middle plate may be used to bear the touchscreen. Space between the middle plate and the rear cover may be used to accommodate a battery of the mobile terminal.

Optionally, the touchscreen is an in-cell touchscreen (means a structure in which a function of a touch panel is implanted in a liquid crystal pixel) or an on-cell touchscreen (means a structure in which a function of the touch panel is implanted between a color filter substrate and a polarizing plate). In another implementation, the touchscreen may be alternatively an out-cell touchscreen. In other words, a touch panel and a display panel are disposed in a stacked manner to form the touchscreen, and the touch panel is disposed between the cover plate and the display panel. A touch circuit layer (a circuit layer for sensing a gesture action of a user) of the touch panel may be formed on the cover plate, so that the touch panel and the cover plate form an integrated structure, and the touchscreen and the cover plate form an integrated structure.

Optionally, the cover plate is a transparent hard plate component, so that an internal part (for example, the touchscreen) of the mobile terminal can be desirably protected, and a good light transmission effect can be achieved. The cover plate may be a glass cover.

Optionally, the adhesive is a hot melt adhesive, so that rapid bonding can be implemented and bonding tightness can be achieved.

In an implementation, the frame body is further provided with a boss. The boss is formed on the bearing surface and is spaced apart from the limiting surface, so that an adhesive injection groove for accommodating the adhesive is formed between the boss and the limiting surface. The boss is in contact with the bottom surface to prevent the adhesive from overflowing towards a direction away from the limiting surface.

In this implementation, the boss is in contact with the cover plate, so that the adhesive can be prevented from overflowing towards the direction away from the limiting surface, and the adhesive can be prevented from overflowing to a position between the frame body and the touchscreen. This avoids an imperfect assembly structure inside the mobile terminal resulting from adhesive overflow, so that the mobile terminal has relatively desirable performance and user experience.

In an implementation, the frame body is further provided with a plurality of limiting bumps. The plurality of limiting bumps are disposed on the limiting surface at intervals, and are in contact with the second side surface. In this case, the plurality of limiting bumps are located in the clearance, and the plurality of limiting bumps are supported between the cover plate and the frame body, so that the cover plate can implement accurate positioning and avoid mismatch or tilting during installation of the cover plate. This increases assembly precision of the cover plate and the frame body, thereby improving yields of the housing assembly and the mobile terminal.

It can be understood that volumes of the plurality of limiting bumps are small, flow resistance generated by the adhesive in the clearance is quite small, and therefore the adhesive can smoothly flow through the plurality of limiting humps.

Optionally, the plurality of limiting bumps may be raised dots, cylinders, or elliptic cylinders, or the like. When the plurality of limiting bumps are elliptic cylinders, a long diameter of an elliptical cross section of the elliptic cylinder is perpendicular to the bearing surface, and a short diameter of the cross section is parallel to the bearing surface. This further reduces the flow resistance of the plurality of limiting bumps to the adhesive.

Optionally, the plurality of limiting bumps are arranged around the limiting surface at intervals to concurrently support four edges of the second side surface.

In an implementation, the side surface further includes a step surface connected between the first side surface and the second side surface, where the accommodating space is enclosed by the step surface, the first side surface, and the limiting surface together, and the decorative ring is disposed in the accommodating space and is bonded to the step surface. The step surface may be parallel or slightly inclined with respect to the bottom surface.

The decorative ring includes an upper surface and a lower surface that are oppositely disposed and an inner ring side surface and an outer ring side surface that are oppositely connected between the upper surface and the lower surface. The upper surface is flush or substantially flush with the top surface of the cover plate, or the upper surface and the top surface of the cover plate are smoothly transitioned to each other. The lower surface is bonded to the step surface. The inner ring side surface and the first side surface are oppositely disposed. The outer ring side surface and the limiting surface are oppositely disposed.

Optionally, the decorative ring is made of a metal material. The decorative ring is in clearance fit with the limiting surface, and the decorative ring is in clearance fit with the first side surface. It can be understood that the decorative ring is made of the metal material with a high-precision processing dimension. Therefore, the outer ring side surface can be in clearance fit with the limiting surface, and a clearance between the outer ring side surface and the limiting surface approaches zero or equals zero. The inner ring side surface can be in clearance fit with the first side surface, and a clearance between the inner ring side surface and the first side surface approaches zero or equal to zero. The decorative ring made of the metal material makes the housing assembly have a metallic texture. This improves user experience and provides electric static protection. In addition, the decorative ring can protect the adhesive, prevent external air, water vapor, and the like from being in direct contact with the adhesive, avoid excessive rapid aging of the adhesive, and be beneficial to prolong a service life of the housing assembly.

Alternatively, the decorative ring is made of an elastic material such as a rubber material. The decorative ring is in interference fit with the limiting surface of the frame body, and the decorative ring is in interference fit with the first side surface of the cover plate. It can be understood that the decorative ring is made of the elastic material and has specific elasticity. Therefore, the outer ring side surface can be in interference fit with the limiting surface, and the inner ring side surface can be in interference fit with the first side surface. The decorative ring is pressed between the limiting surface and the first side surface, thereby being capable of water proofing and dust proofing. In this case, the decorative ring and the adhesive constitute a double sealing structure of the housing assembly, so that the mobile terminal has excellent waterproof performance and dustproof performance, and the service life of the mobile terminal is prolonged.

Optionally, the decorative ring is bonded to the step surface by using back glue, so that the decorative ring is fixedly disposed in the accommodating space. A thickness of the back glue is designed based on a spacing between the lower surface and the step surface.

Alternatively, the adhesive is further disposed on the step surface, and the decorative ring is bonded to the adhesive by using back glue to be fastened onto the step surface. In this case, the adhesive is allowed to overflow from the clearance onto the step surface, thereby reducing assembly difficulty of the housing assembly and improving the yield of the housing assembly.

Alternatively, the adhesive is further disposed on the step surface, and the decorative ring is bonded to the step surface by using the adhesive. The adhesive has adhesion. Therefore, when the decorative ring is directly bonded to the step surface by using the adhesive, steps in an assembly process of the housing assembly can be reduced, and costs of the housing assembly can be reduced. In addition, there is an extremely small clearance or there is no clearance between the decorative ring and the limiting surface and between the decorative ring and the first side surface. Therefore, the decorative ring can effectively block the adhesive and prevent the adhesive from overflowing to outside the housing assembly, ensuring a favorable appearance of the housing assembly.

In an implementation, the cover plate is of an integrated structure. For example, the cover plate may be of an integrally formed structure, or the cover plate may include a first cover plate and a second cover plate that are attached to each other in a stacked manner. The first cover plate and the second cover plate may be bonded by using an optically clear adhesive (Optically Clear Adhesive, OCA). A surface, away from the second cover plate, of the first cover plate is the top surface, a surface, away from the first cover plate, of the second cover plate is the bottom surface, and the step surface is formed in an edge region of a surface, close to the first cover plate, of the second cover plate.

According to a second aspect, an embodiment of this application further provides a mobile terminal, including a touchscreen and the housing assembly according to any one of the foregoing implementations, where the touchscreen is installed to an inner side of the frame body and is attached to the bottom surface. The mobile terminal has a narrow bezel and a favorable appearance.

In an implementation, the touchscreen includes a display area and a non-display area surrounding the display area. An orthographic projection of the display area of the touchscreen on the bottom surface coincides with (including completely coinciding with or substantially completely coinciding with) an orthographic projection of the top surface on the bottom surface. In this case, the display area displays an image by using the top surface, and the non-display area is covered by the decorative ring, thereby eliminating a black display edge of the touchscreen, so that a visual effect without a black display edge is achieved on the mobile terminal.

It can be understood that the mobile terminal has a narrow bezel and no black display and therefore the mobile terminal has a large screen-to-body ratio. Compared with the prior art, in this embodiment of this application, a screen-to-body ratio of the mobile terminal can be increased by approximately 3%, and the screen-to-body ratio is greatly increased.

According to a third aspect, an embodiment of this application further provides a method for assembling a housing assembly, where the method is used for forming the housing assembly according to any of the foregoing implementations.

The method for assembling a housing assembly includes the following steps:

providing a frame body, where a bearing surface and a limiting surface are disposed on an inner side of the frame body;

dispensing an adhesive on the bearing surface;

providing a cover plate, where the cover plate includes a top surface, a bottom surface, and a side surface surroundingly connected between the top surface and the bottom surface, and the side surface includes a first side surface connected to the top surface and a second side surface connected to the bottom surface;

installing the cover plate to the inner side of the frame body, where the bottom surface is fastened to the bearing surface by using the adhesive, the bottom surface presses a part of the adhesive to a clearance between the second side surface and the limiting surface, and accommodating space is formed between the first side surface and the limiting surface; and installing a decorative ring to the accommodating space and making the decorative ring cover the bearing surface.

In this implementation, the decorative ring can cover the bearing surface after being installed, and therefore the decorative ring also covers the adhesive. Therefore, according to the method for assembling a housing assembly, overflow of the adhesive does not affect an appearance of the housing assembly, and even reliability of the housing assembly can be improved by pressing a part of the adhesive to the clearance, so that an assembly process of the housing assembly is simple with low difficulty, and the housing assembly has a high yield.

Optionally, according to the method for assembling a housing assembly, different manners of bonding the decorative ring may be selected based on an overflow situation of the adhesive, so that assembly difficulty of the housing assembly is further reduced, and the yield of the housing assembly is increased. Specifically:

the bottom surface only presses a part of the adhesive to the clearance, that is, when the adhesive is filled in the clearance and does not overflow onto the step surface, after the adhesive is cured, the decorative ring is bonded to the step surface by using back glue.

When the bottom surface concurrently presses the part of the adhesive to the clearance and onto the step surface, if a small amount of the adhesive overflows onto the step surface, after the adhesive is cured, the decorative ring is installed to the accommodating space and is bonded to the adhesive by using the back glue; or if a large amount of the adhesive overflows onto the step surface, after the decorative ring is installed to the accommodating space and is in contact with the adhesive, the adhesive is cured.

It can be understood that in the method for assembling a housing assembly, a bonding manner of the decorative ring and the step surface may be first designed, and an injection amount of the adhesive is then appropriately set, so that a yield of the housing assembly is improved.

DESCRIPTION OF EMBODIMENTS

Figure 1:
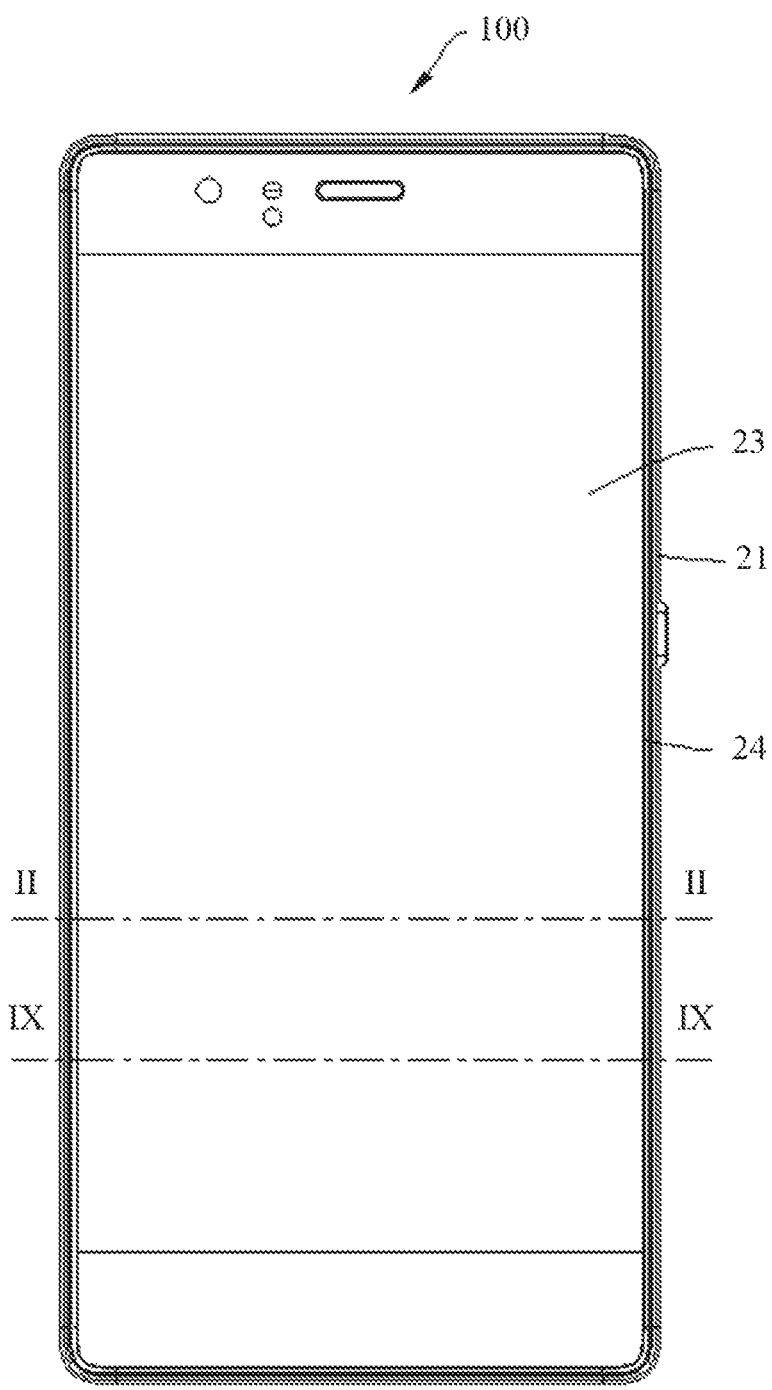
FIG. 1 is a schematic structural diagram of a mobile terminal according to an embodiment of this application.
Figure 2:
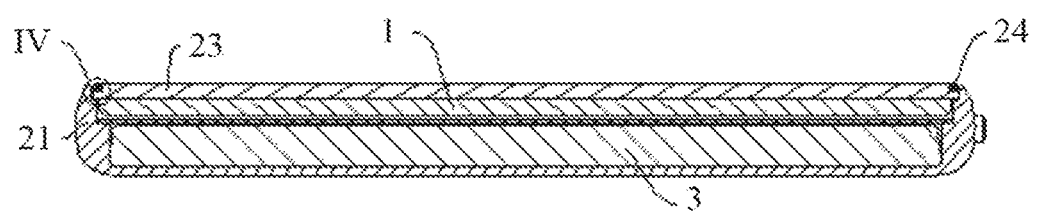
FIG. 2 is a cross-sectional view, obtained by cutting along a line II-II, of a structure in FIG. 1.
Figure 3:
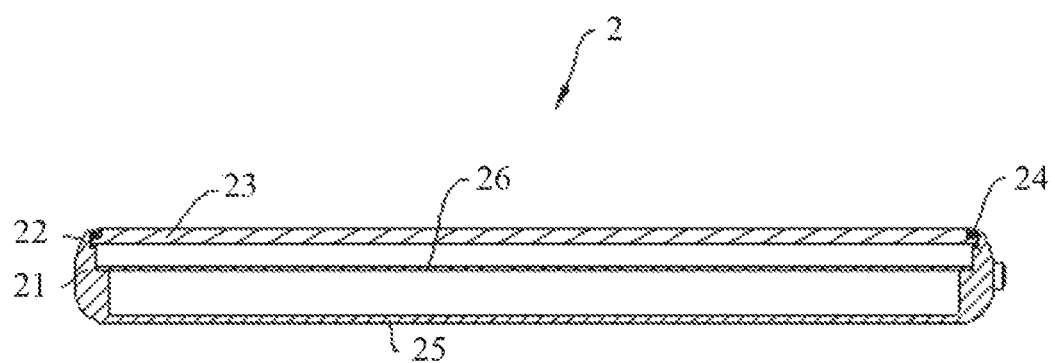
FIG. 3 is a schematic structural diagram of a first implementation of a housing assembly of the mobile terminal shown in FIG. 1.

The following describes the embodiments of this application with reference to the accompanying drawings in the embodiments of this application.

Referring to FIG. 1 to FIG. 8 together, an embodiment of this application provides a mobile terminal 100. The mobile terminal 100 may be a mobile phone, a tablet computer, a notebook computer, or the like. The mobile terminal 100 includes a touchscreen 1 and a housing assembly 2.

The housing assembly 2 includes a frame body 21, an adhesive 22, a cover plate 23, and a decorative ring 24. A bearing surface 211 and a limiting surface 212 are disposed on an inner side of the frame body 21. The cover plate 23 includes a top surface 231 and a bottom surface 232 that are oppositely disposed and a side surface 233 surroundingly connected between the top surface 231 and the bottom surface 232. The side surface 233 includes a first side surface 2331 connected to the top surface 231 and a second side surface 2332 connected to the bottom surface 232. The cover plate 23 is installed to the inner side of the frame body 21. The adhesive 22 is disposed between the bottom surface 232 and the bearing surface 211 and between the second side surface 2332 and the limiting surface 212, that is, the adhesive is bonded between the bottom surface 232 and the bearing surface 211 and between the second side surface 2332 and the limiting surface 212 in an integrated manner. Accommodating space 2122 is provided between the first side surface 2331 and the limiting surface 212. The decorative ring 24 is disposed in the accommodating space 2122 and covers the bearing surface 211. The touchscreen 1 is installed to the inner side of the frame body 21 and is attached to the bottom surface 232.

Specifically, the frame body 21 forms an opening 213 and an accommodating cavity 214 communicated with the opening 213. A cavity wall of the accommodating cavity 214 includes the bearing surface 211 facing the opening 213 and the limiting surface 212 connected between the opening 213 and the bearing surface 211. Both the bearing surface 211 and the limiting surface 212 are disposed around the accommodating cavity 214. The adhesive 22 includes a first part 221 and a second part 222 connected to the first part 221. The first part 221 is formed between the bottom surface 232 and the bearing surface 211, so that the bottom surface 232 is bonded to the bearing surface 211. The second part 222 is formed in a clearance 2121 between the second side surface 2332 and the limiting surface 212, so that the second side surface 2332 is bonded to the limiting surface 212. The adhesive 22 may be first disposed on the bearing surface 211, and then the adhesive 22 is pressed by the bottom surface 232, so that a part of the adhesive 22 is pressed into the clearance 2121. The touchscreen 1 is attached to the bottom surface 232, and the bottom surface 232 is perpendicular to a display direction X of the touchscreen 1. That the decorative ring 24 covers the bearing surface 211 means that an orthographic projection of the decorative ring 24 on the bottom surface 232 covers an orthographic projection of the bearing surface 211 on the bottom surface 232, so that the decorative ring 24 covers the bearing surface 211 from appearance vision. A display surface of the touchscreen 1 is attached to the bottom surface 232, so that a touch function and a display function can be implemented by using the cover plate 23. A shape of the bearing surface 211 is matched with a shape of an edge of the bottom surface 232, and a shape of the limiting surface 212 is matched with a shape of the second side surface 2332, so that the adhesive 22 can make the cover plate 23 sufficiently bonded to the frame body 21.

In this embodiment, the cover plate 23 is bonded to the bearing surface 211 by using the bottom surface 232 and is bonded to the limiting surface 212 by using the second side surface 2332. Therefore, compared with the prior art, a bonding area between the cover plate 23 and the frame body 21 is increased in the housing assembly 2, so that the housing assembly 2 has sufficient reliability in a roller test and a drop test. In a case of ensuring that there is an adequate bonding force between the cover plate 23 and the frame body 21, the housing assembly 2 may be provided with the relatively narrow bearing surface 211, so that the housing assembly 2 presents a narrow bezel visual effect. In addition, the decorative ring 24 covers the bearing surface 211, and therefore the decorative ring 24 also covers the adhesive 22. When a user uses the mobile terminal 100, only the frame body 21 and the decorative ring 24 can be seen from an appearance, and the bearing surface 211 and the adhesive 22 are not seen. Therefore, the housing assembly 2 has a favorable decorative appearance. In short, the housing assembly 2 has a narrow bezel and a favorable appearance, and the mobile terminal 100 to which the housing assembly 2 is applied has a narrow bezel and a favorable appearance.

Because the clearance 2121 is filled by the adhesive 22, there is no clearance between the cover plate 23 and the frame body 21, and the housing assembly 2 is capable of water proofing and dust proofing. In a direction parallel to the bottom surface 232, the cover plate 23 and the frame body 21 (that is, the second side surface 2332 and the limiting surface 212) are connected by using the adhesive 22, and a hard-soft-hard connection is formed between the cover plate 23 and the frame body 21. Therefore, when the mobile terminal 100 suffers a collision or is pressed, the adhesive 22 can function as a cushion to reduce a risk of breaking the cover plate 23.

Optionally, the touchscreen includes a display area 11 and a non-display area 12 surrounding the display area 11. An orthographic projection of the display area 11 of the touchscreen 1 on the bottom surface 232 completely coincides with or substantially completely coincides with an orthographic projection of the top surface 231 on the bottom surface 232. In this case, the display area 11 displays an image by using the top surface 231, and the non-display area 12 is covered by the decorative ring 24, thereby eliminating a black display edge of the touchscreen 1, so that a visual effect without a black display edge is achieved on the mobile terminal 100.

It can be understood that the mobile terminal 100 has a narrow bezel and no black display edge, and therefore the mobile terminal 100 has a large screen-to-body ratio. Compared with the prior art, in this embodiment of this application, a screen-to-body ratio of the mobile terminal 100 can be increased by approximately 3%, and the screen-to-body ratio is greatly increased.

Optionally, the housing assembly 2 further includes a rear cover 25. The rear cover 25 and the frame body 21 are integrated, or form an integrated structure in an assembly manner (bonding, buckle connection, threaded connection, or the like). The frame body 21 and the rear cover 25 jointly form an enclosure 29 of the mobile terminal 100. The accommodating cavity 214 is enclosed by the rear cover 25 and the frame body 21 together, and the accommodating cavity 214 is used to accommodate components of the mobile terminal 100.

A positioning surface 215 is further disposed on the inner side of the frame body 21, and the positioning surface 215 is formed on the cavity wall of the accommodating cavity 214 and is disposed around the accommodating cavity 214. The positioning surface 215 is disposed facing the opening 213. The housing assembly 2 further includes a middle plate 26. The middle plate 26 is installed to the inner side of the frame body 21 (that is, disposed in the accommodating cavity 214) and is abutted against the positioning surface 215. The middle plate 26 may be used to bear the touchscreen 1. Space between the middle plate 26 and the rear cover 25 may be used to accommodate a battery 3 of the mobile terminal 100.

Optionally, the touchscreen 1 is an in-cell touchscreen (which means a structure in which a function of a touch panel is implanted in a liquid crystal pixel) or an on-cell touchscreen (which means a structure in which a function of the touch panel is implanted between a color filter substrate and a polarizing plate). Certainly, in another implementation, the touchscreen 1 may be alternatively an out-cell touchscreen, in other words, a touch panel and a display panel are disposed in a stacked manner to form the touchscreen 1, and the touch panel is disposed between the cover plate 23 and the display panel. A touch circuit layer (a circuit layer for sensing a gesture action of a user) of the touch panel may be formed on the cover plate 23, so that the touch panel and the cover plate 23 form an integrated structure, and the touchscreen 1 and the cover plate 23 form an integrated structure.

Optionally, the cover plate 23 is a transparent hard plate component, so that an internal part (for example, the touchscreen 1) of the mobile terminal 100 can be desirably protected, and a good light transmission effect can be achieved. The cover plate 23 may be a glass cover 23.

Optionally, the adhesive 22 is a hot melt adhesive, so that rapid bonding can be implemented and bonding tightness can be achieved.

Figure 4:
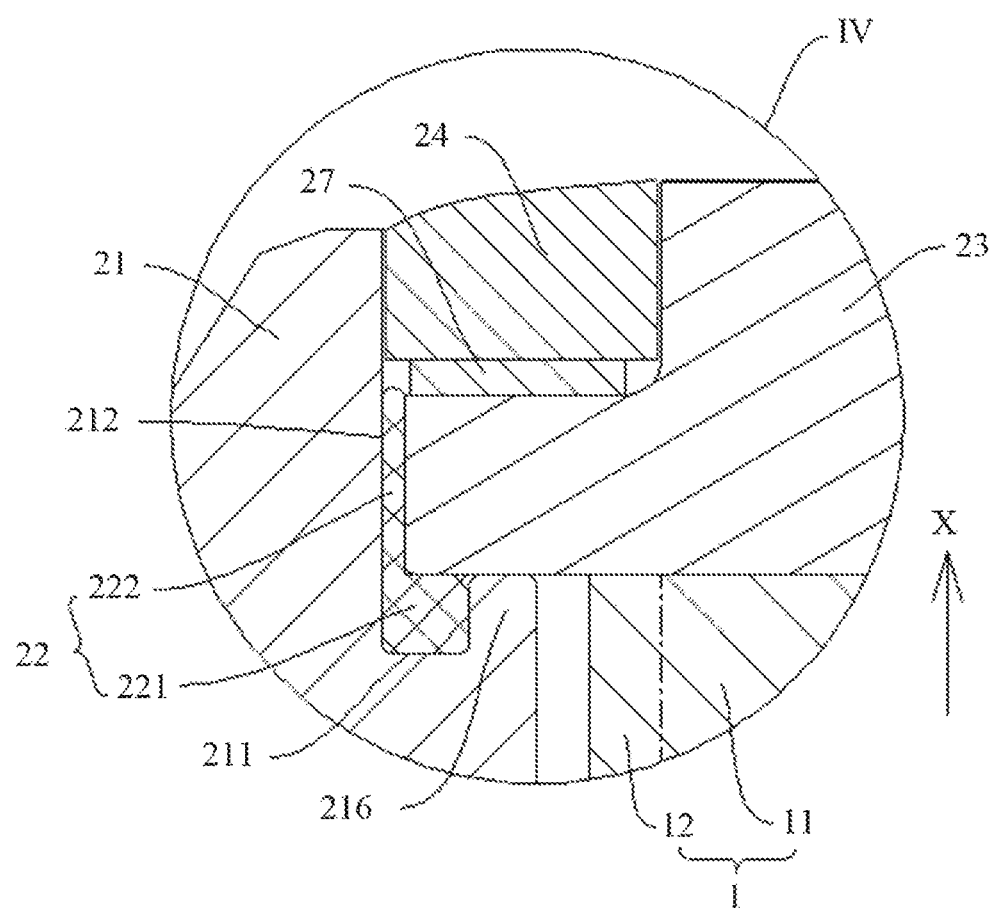
FIG. 4 is an enlarged schematic diagram of a structure of a position VI in FIG. 2.
Figure 5:
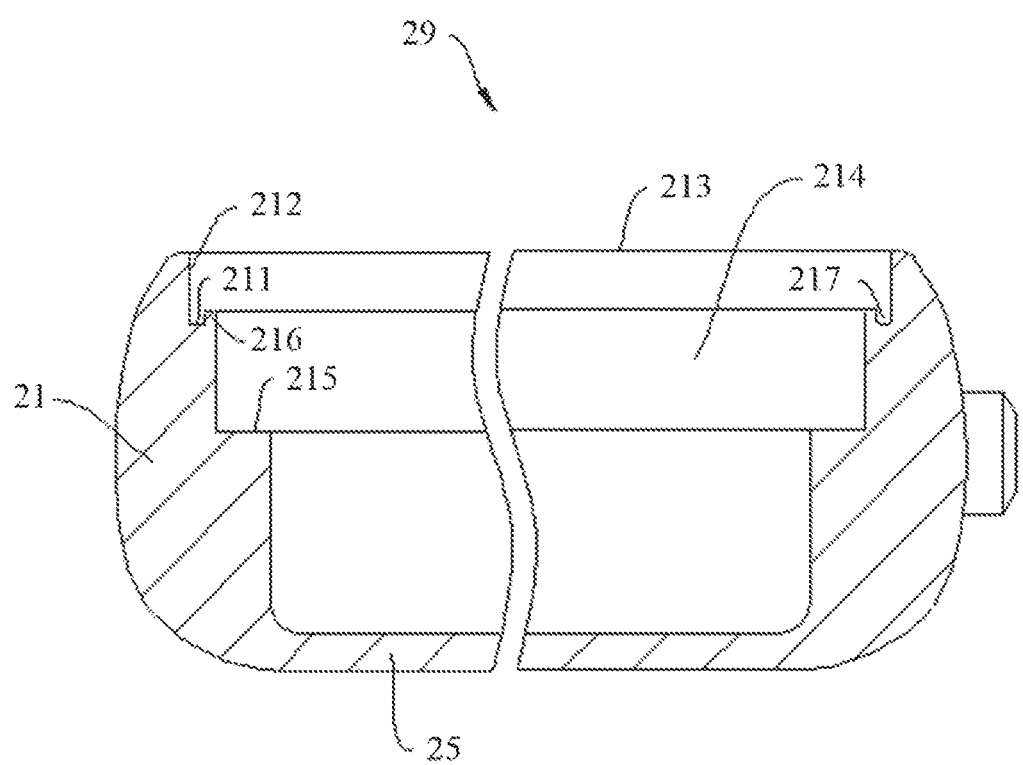
FIG. 5 is a schematic structural diagram of an enclosure of the mobile terminal shown in FIG. 1.
Figure 6:
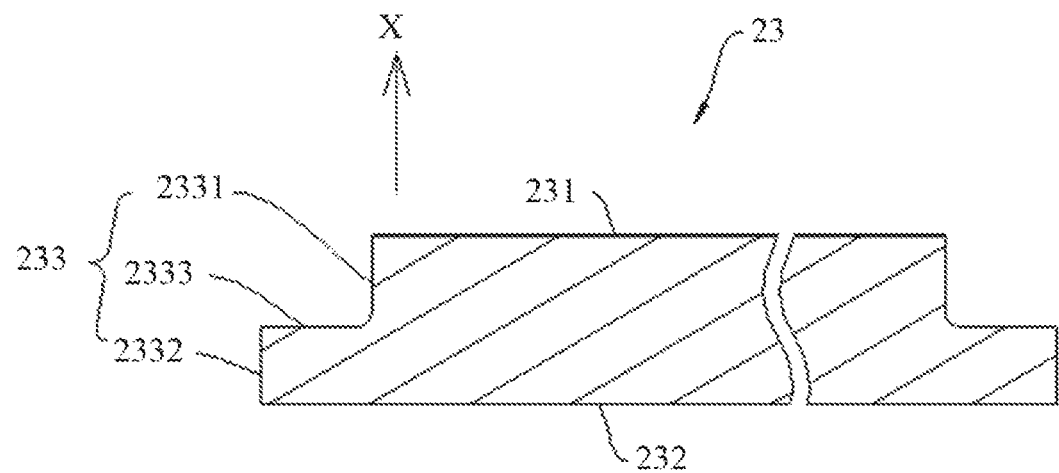
FIG. 6 is a schematic structural diagram of an implementation of a cover plate of the mobile terminal shown in FIG. 1.
Figure 7:
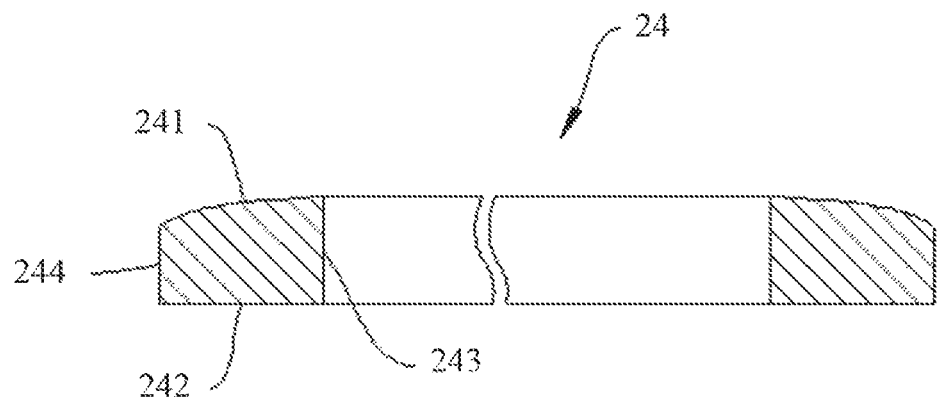
FIG. 7 is a schematic structural diagram of a decorative ring of the mobile terminal shown in FIG. 1.
Figure 8:
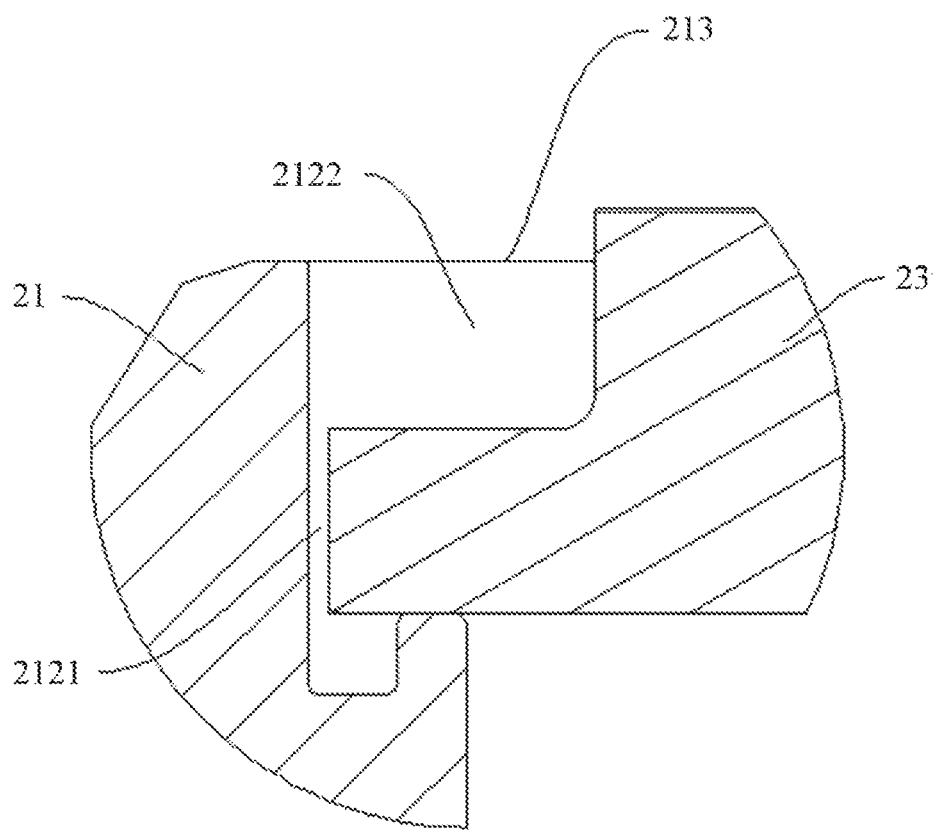
FIG. 8 is a schematic structural diagram of fitting of a cover plate and a bezel of the mobile terminal shown in FIG. 1.

In an optional embodiment, referring to FIG. 4 to FIG. 6 together, the frame body 21 is further provided with a boss 216. The boss 216 is formed on the bearing surface 211 and is spaced apart from the limiting surface 212, so that an adhesive injection groove 217 for accommodating the adhesive 22 is formed between the boss 216 and the limiting surface 212. The boss 216 is in contact with the bottom surface 232 to prevent the adhesive 22 from overflowing towards a direction away from the limiting surface 212. In this case, the boss 216 is disposed around the accommodating cavity 214.

In this embodiment, the boss 216 is in contact with the cover plate 23, so that the adhesive 22 can be prevented from overflowing towards the direction away from the limiting surface 212, and the adhesive 22 can be prevented from overflowing to a position between the frame body 21 and the touchscreen 1. This avoids an imperfect assembly structure inside the mobile terminal 100 resulting from adhesive overflow, so that the mobile terminal 100 has relatively desirable performance and user experience.

Figure 9:
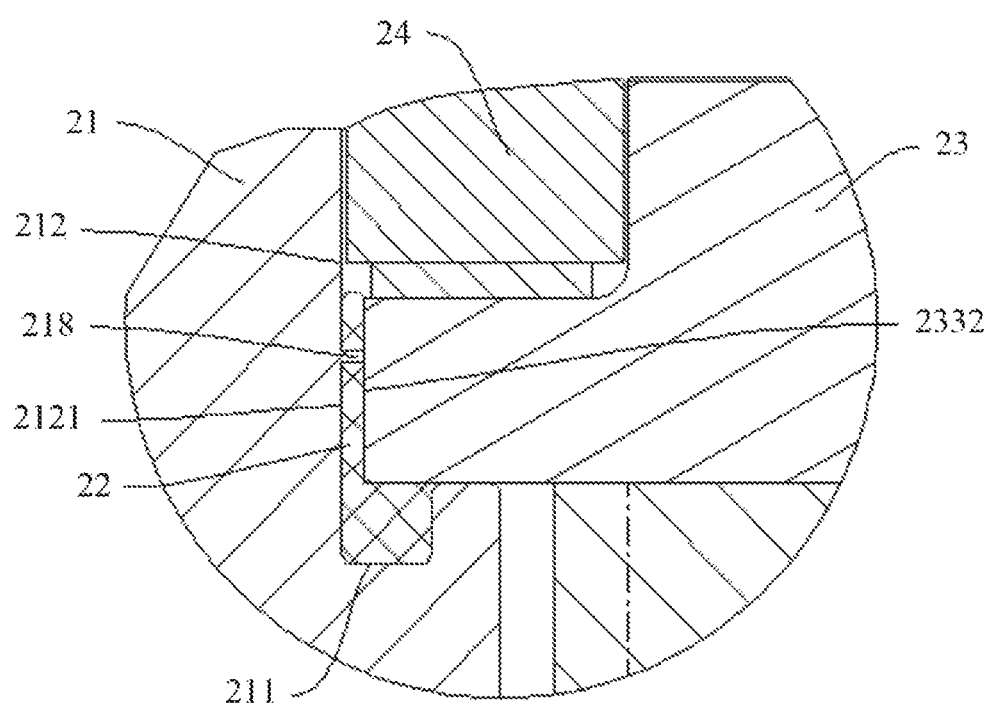
FIG. 9 is a part of a cross-sectional view, obtained by cutting along a line IX-IX, of a structure in FIG. 1.
Figure 10:
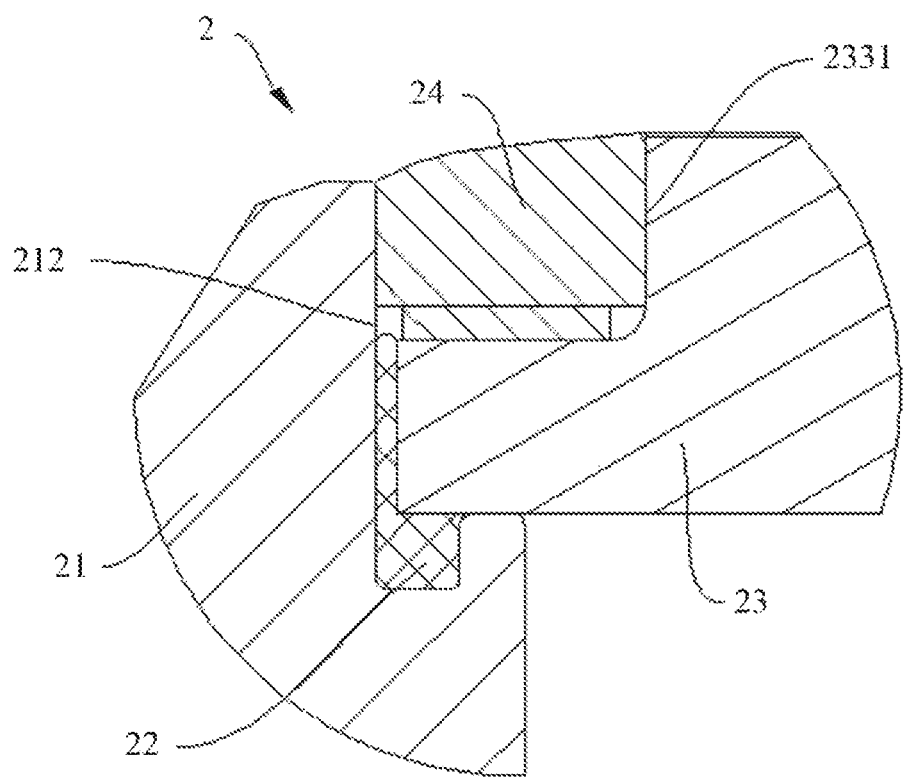
FIG. 10 is a schematic structural diagram of a second implementation of the housing assembly of the mobile terminal shown in FIG. 1.

In an optional embodiment, referring to FIG. 9, the frame body 21 is further provided with a plurality of limiting bumps 218. The plurality of limiting bumps 218 are disposed on the limiting surface 212 at intervals, and are in contact with the second side surface 2332. In this case, the plurality of limiting bumps 218 are located in the clearance 2121, and the plurality of limiting bumps 218 are supported between the cover plate 23 and the frame body 21, so that the cover plate 23 can implement accurate positioning and avoid mismatch or tilting during installation of the cover plate 23. This increases assembly precision of the cover plate 23 and the frame body 21, thereby improving yields of the housing assembly 2 and the mobile terminal 100.

It can be understood that volumes of the plurality of limiting bumps 218 are small, flow resistance generated by the adhesive 22 in the clearance 2121 is quite small, and therefore the adhesive 22 can smoothly flow through the plurality of limiting bumps 218.

Optionally, the plurality of limiting bumps 218 may be raised dots, cylinders, or elliptic cylinders, or the like. When the plurality of limiting bumps 218 are elliptic cylinders, a long diameter of an elliptical cross section of the elliptic cylinder is perpendicular to the bearing surface 211, and a short diameter of the cross section is parallel to the bearing surface 211. This further reduces the flow resistance of the plurality of limiting bumps 218 to the adhesive 22.

Optionally, the plurality of limiting bumps 218 are arranged around the limiting surface 212 at intervals to concurrently support four edges of the second side surface 2332. For example, when orthographic projections of the limiting surface 212 and the second side surface 2332 on the bearing surface 211 are substantially rectangular, the plurality of limiting bumps 218 are arranged at two long edges and two short edges of the rectangle at intervals. The long edge may be provided with at least two of the limiting bumps 218, and the short edge may be provided with at least one of the limiting bumps 218.

In an optional embodiment, referring to FIG. 4 to FIG. 8 together, the side surface 233 further includes a step surface 2333 connected between the first side surface 2331 and the second side surface 2332. The accommodating space 2122 is enclosed by the step surface 2333, the first side surface 2331, and the limiting surface 212 together, and the decorative ring 24 is disposed in the accommodating space 2122 and is bonded to the step surface 2333. In this case, the step surface 2333 is disposed facing the opening 213. The step face 2333 may be parallel or slightly inclined with respect to the bottom surface 232 (for example, an angle of 0° to 15° is formed between the step face 2333 and the bottom surface 232).

In this embodiment, when the decorative ring 24 is disposed in the accommodating space 2122 and is bonded to the step surface 2333, the decorative ring 24 covers the step surface 2333, and an orthographic projection of the non-display area 12 of the touchscreen 1 on the bottom surface 232 falls within a range of an orthographic projection of the step surface 2333 on the bottom surface 232, so that a user does not see a black edge when using the mobile terminal 100. This improves user experience.

The decorative ring 24 includes an upper surface 241 and a lower surface 242 that are oppositely disposed and an inner ring side surface 243 and an outer ring side surface 244 that are oppositely connected between the upper surface 241 and the lower surface 242. The upper surface 241 is flush or substantially flush with the top surface 231 of the cover plate 23, or the upper surface 241 and the top surface 231 of the cover plate 23 are smoothly transitioned to each other. The lower surface 242 is bonded to the step surface 2333. The inner ring side surface 243 and the first side surface 2331 are oppositely disposed. The outer ring side surface 244 and the limiting surface 212 are oppositely disposed.

Optionally, the decorative ring 24 is made of a metal material. The decorative ring 24 is in clearance fit with the limiting surface 212, and the decorative ring 24 is in clearance fit with the first side surface 2331. It can be understood that the decorative ring 4 is made of the metal material with a high-precision processing dimension. Therefore, the outer ring side surface 244 can be in clearance fit with the limiting surface 212, and a clearance between the outer ring side surface 244 and the limiting surface 212 approaches zero or equals zero. The inner ring side surface 243 can be in clearance fit with the first side surface 2331, and a clearance between the inner ring side surface 243 and the first side surface 2331 approaches zero or equal to zero. The decorative ring 24 made of the metal material makes the housing assembly 2 have a metallic texture. This improves user experience and provides electric static protection. In addition, the decorative ring 24 can protect the adhesive 22, prevent external air, water vapor, and the like from being in direct contact with the adhesive 22, avoid excessive rapid aging of the adhesive 22, and be beneficial to prolong a service life of the housing assembly 2.

Alternatively, referring to FIG. 5 to FIG. 8 and FIG. 10 together, the decorative ring 24 is made of an elastic material such as a rubber material. The decorative ring 24 is in interference fit with the limiting surface 212 of the frame body 21, and the decorative ring 24 is in interference fit with the first side surface 2331 of the cover plate 23. It can be understood that the decorative ring 24 is made of the elastic material and has specific elasticity. Therefore, the outer ring side surface 244 can be in interference fit with the limiting surface 212, and the inner ring side surface 243 can be in interference fit with the first side surface 2331. The decorative ring 24 is pressed between the limiting surface 212 and the first side surface 2331, thereby being capable of water proofing and dust proofing. In this case, the decorative ring 24 and the adhesive 22 constitute a double sealing structure of the housing assembly 2, so that the mobile terminal 100 has excellent waterproof performance and dustproof performance, and the service life of the mobile terminal 100 is prolonged.

In an implementation, a width of the step surface 2333 may range from 0.6 mm to 0.8 mm. A width of the clearance 2121 between the limiting surface 212 and the second side surface 2332 may range from 0.2 mm to 0.4 mm. A width of the decorative ring 24 is a sum of the width of the step surface 2333 and the width of the clearance 2121, and ranges from 0.8 mm to 1.2 mm.

Optionally, referring to FIG. 4 to FIG. 8 together, the decorative ring 24 is bonded to the step surface 2333 by using back glue 27, so that the decorative ring 24 is fixedly disposed in the accommodating space 2122. A thickness of the back glue 27 is designed based on a spacing between the lower surface 242 and the step surface 2333.

Alternatively, referring to FIG. 5 to FIG. 8, FIG. 11, and FIG. 12 together, the adhesive 22 is further disposed on the step surface 2333, and the decorative ring 24 is bonded to the adhesive 22 by using back glue 27, to be fastened onto the step surface 2333. In this case, the bottom surface 232 concurrently presses a part of the adhesive 22 to the clearance 2121 and onto the step surface 2333. The adhesive 22 further includes a third part 223 on the step surface 2333. The third part 223 is connected to the second part 222, that is, the third part 223 is bonded between the bottom surface 232 and the bearing surface 211, between the second side surface 2332 and the limiting surface 212, and on the step surface 2333 in an integrated manner.

Figure 11:
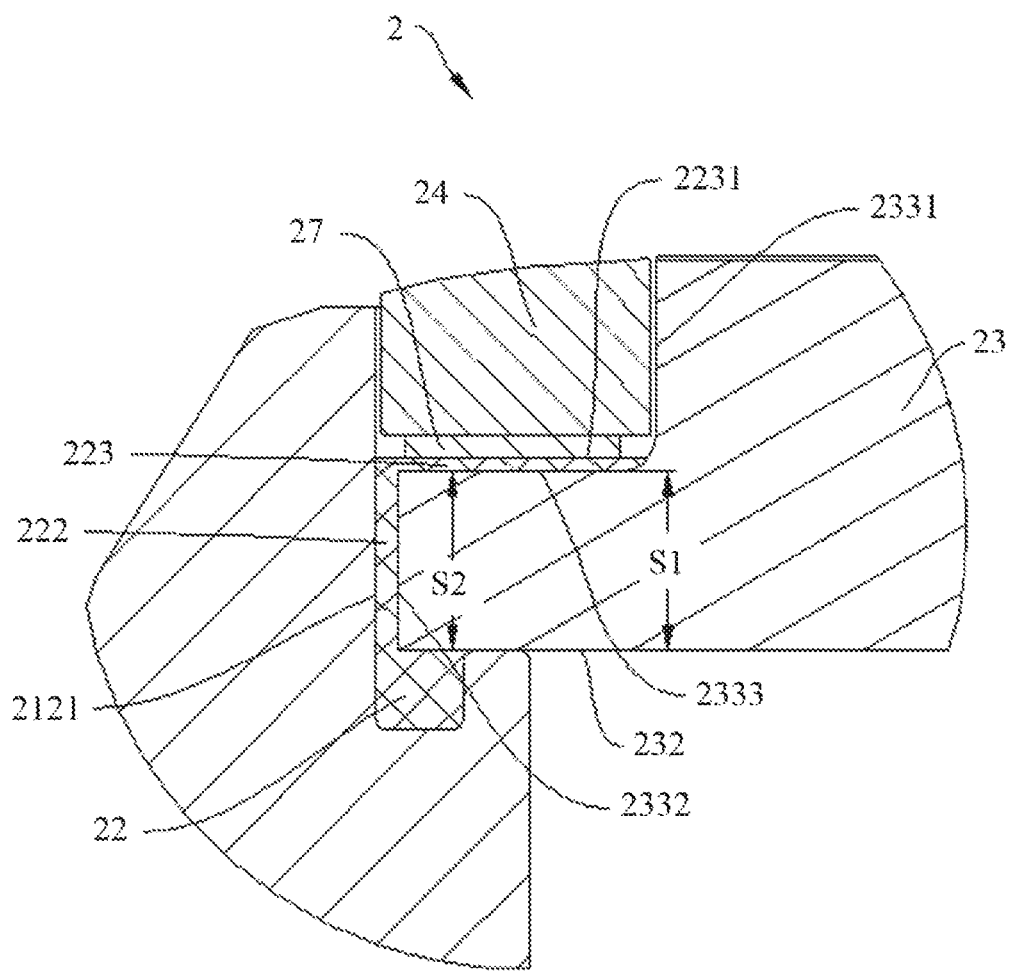
FIG. 11 is a schematic structural diagram of a third implementation of the housing assembly of the mobile terminal shown in FIG. 1.
Figure 12:
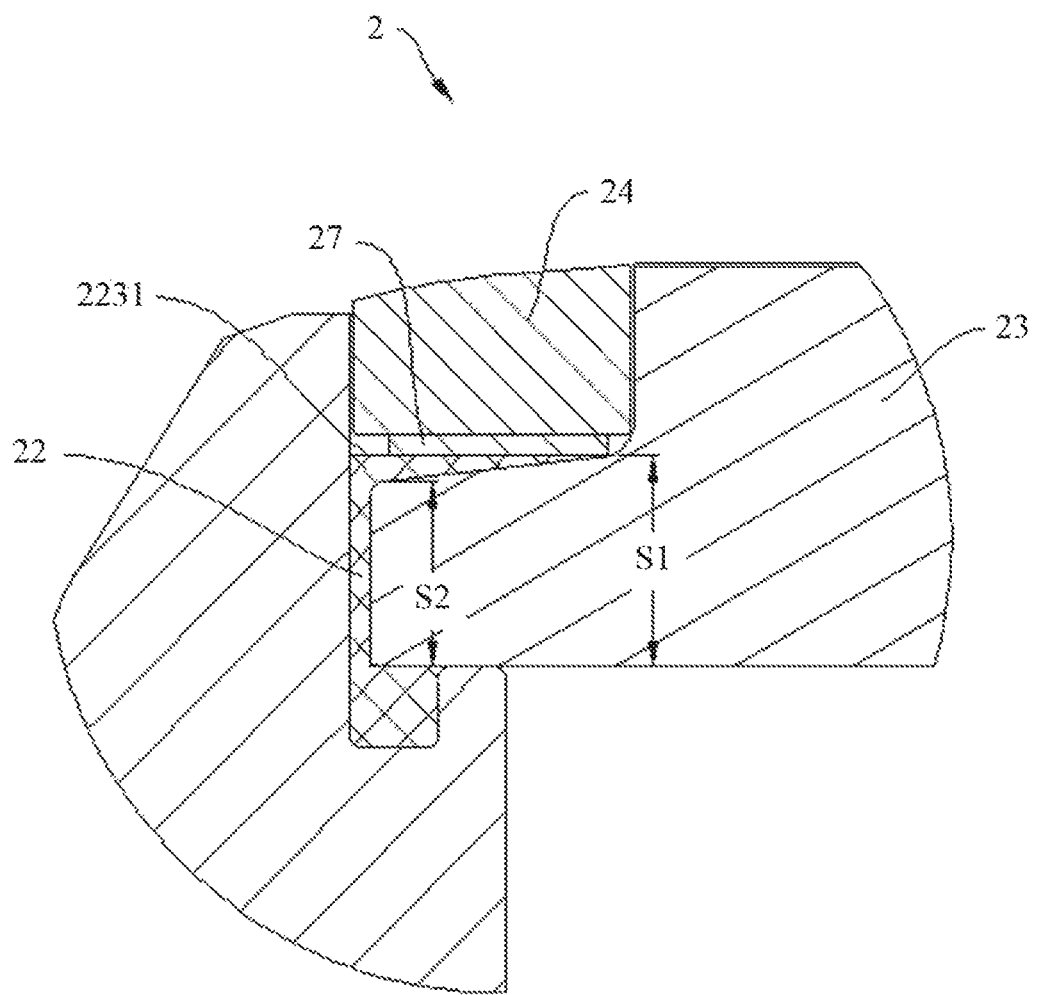
FIG. 12 is a schematic structural diagram of a fourth implementation of the housing assembly of the mobile terminal shown in FIG. 1.

In this embodiment, the housing assembly 2 allows the adhesive 22 to overflow from the clearance 2121 onto the step surface 2333, thereby reducing assembly difficulty of the housing assembly 2, and improving a yield of the housing assembly 2. In an implementation, a first spacing S1 is formed between the bottom surface 232 and an end, connected to the first side surface 2331, of the step surface 2333, and a second spacing S2 is formed between the bottom surface 232 and an end, connected to the second side surface 2332, of the step surface 2333. Because a relatively small amount of the adhesive 22 overflows onto the step surface 2333, the first spacing S1 may be set to be equal to (as shown in FIG. 11) or larger than (as shown in FIG. 12) the second spacing S2, so that the adhesive 22 slowly covers the step surface 2333, and a surface 2231, facing the decorative ring 24, of the third part 223 approaches a flat surface. This is beneficial for a subsequent bonding process of the decorative ring 24. A thickness of the back glue 27 is designed based on a spacing between the lower surface 242 and the surface 2231 of the third part 223.

Figure 13:
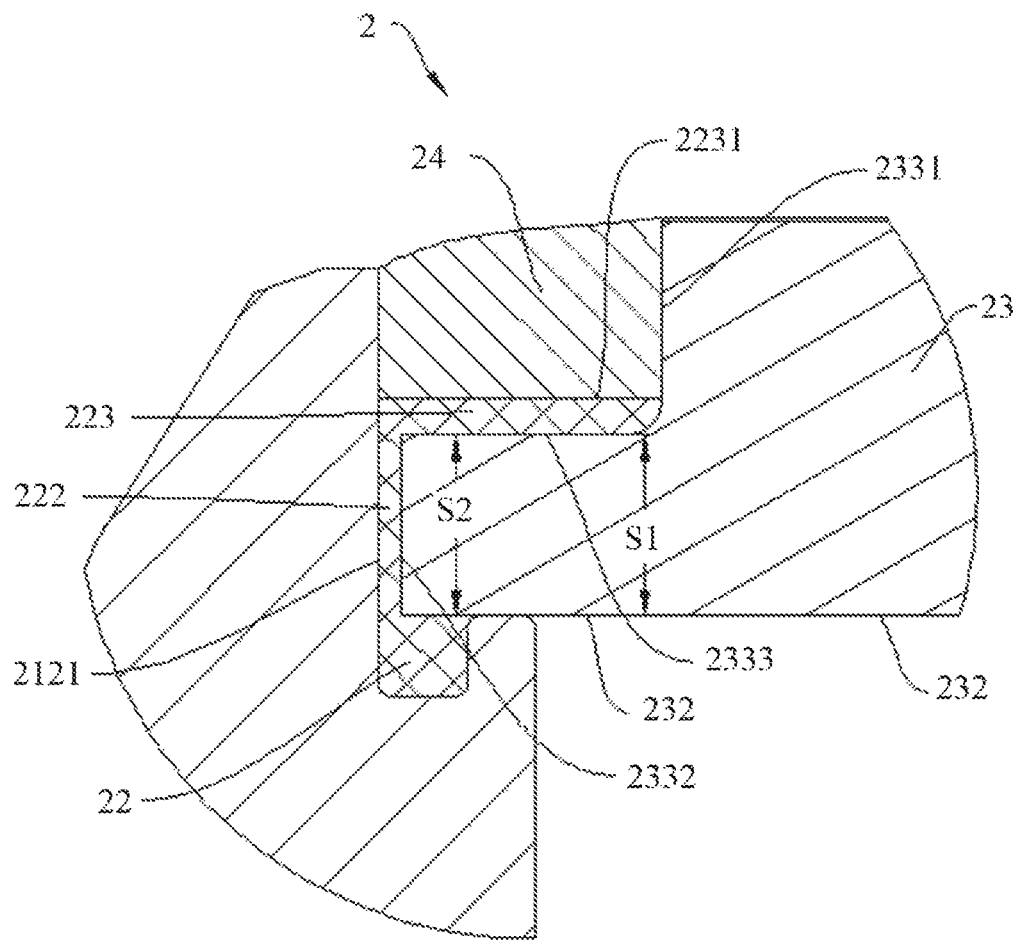
FIG. 13 is a schematic structural diagram of a fifth implementation of the housing assembly of the mobile terminal shown in FIG. 1.
Figure 14:
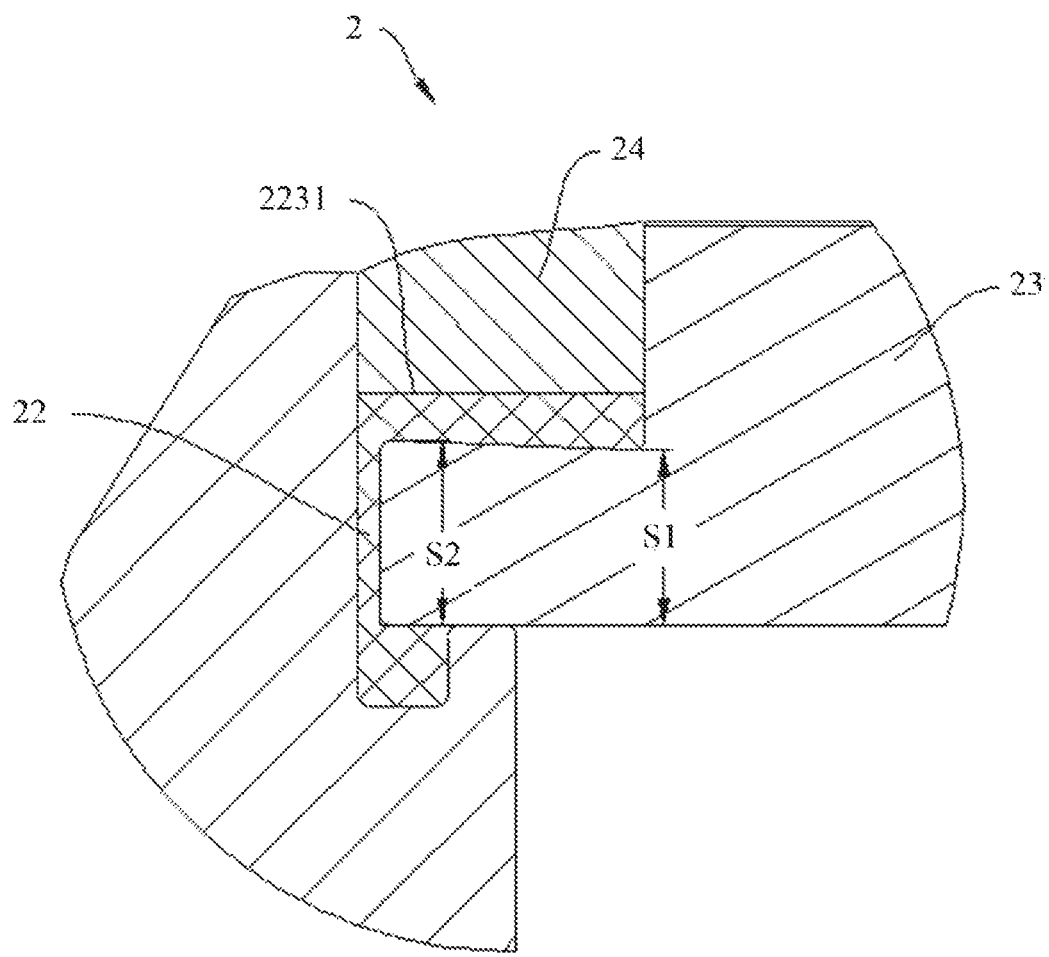
FIG. 14 is a schematic structural diagram of a sixth implementation of the housing assembly of the mobile terminal shown in FIG.

Alternatively, referring to FIG. 5 to FIG. 8, FIG. 13, and FIG. 14 together, the adhesive 22 is further disposed on the step surface 2333, and the decorative ring 24 is bonded to the step surface 2333 by using the adhesive 22. In this case, the bottom surface 232 concurrently presses a part of the adhesive 22 to the clearance 2121 and onto the step surface 2333. The adhesive 22 further includes a third part 223 on the step surface 2333, and the third part 223 is connected to the second part 222. The adhesive 22 has adhesion. Therefore, when the decorative ring 24 is directly bonded to the step surface 2333 by using the adhesive 22, steps in an assembly process of the housing assembly 2 can be reduced, and costs of the housing assembly 2 can be reduced. In addition, there is an extremely small clearance or there is no clearance between the decorative ring 24 and the limiting surface 212 and between the decorative ring 24 and the first side surface 2331. Therefore, the decorative ring 24 can effectively block the adhesive 22 and prevent the adhesive 22 overflowing to outside the housing assembly 2, ensuring a favorable appearance of the housing assembly 2. In an implementation, a first spacing S1 is formed between the bottom surface 232 and an end, connected to the first side surface 2331, of the step surface 2333, and a second spacing S2 is formed between the bottom surface 232 and an end, connected to the second side surface 2332, of the step surface 2333. Because a relatively large amount of the adhesive 22 overflows onto the step surface 2333, the first spacing S1 may be set to be equal to (as shown in FIG. 13) or smaller than (as shown in FIG. 14) the second spacing S2, to ensure that the adhesive 22 completely covers the step surface 2333. A surface 2231, facing the decorative ring 24, of the third part 223 approaches a flat surface. This is beneficial for a bonding process of the decorative ring 24.

Figure 15:
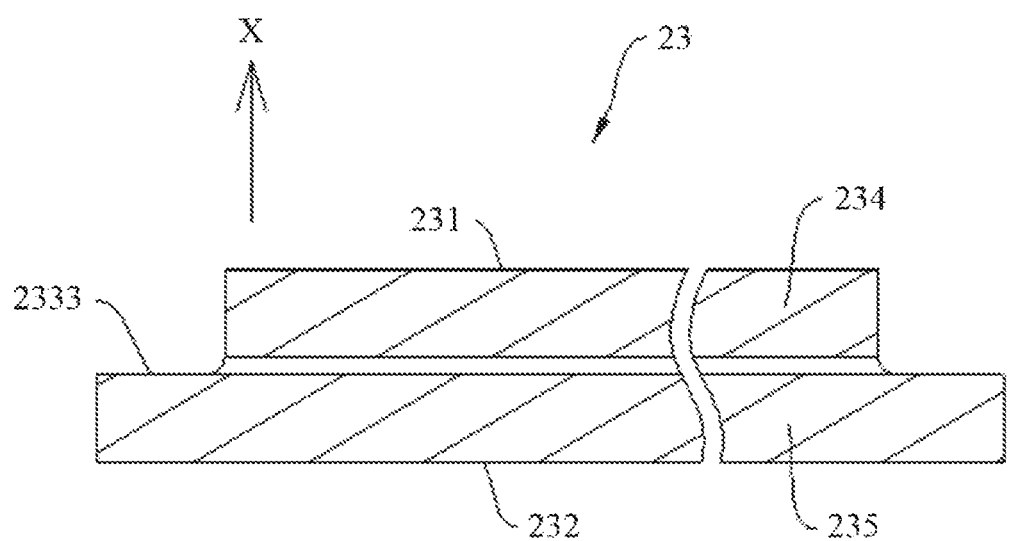
FIG. 15 is a schematic structural diagram of another implementation of the cover plate of the mobile terminal shown in FIG. 1.

In an optional embodiment, referring to FIG. 6 and FIG. 15, the cover plate 23 is of an integrated structure. For example, the cover plate 23 may be of an integrally formed structure shown in FIG. 6), or the cover plate 23 may include a first cover plate 234 and a second cover plate 235 that are attached to each other in a stacked manner (as shown in FIG. 15). The first cover plate 234 and the second cover plate 235 may be bonded by using an optically clear adhesive (Optically Clear Adhesive, OCA) 236. A surface, away from the second cover plate 235, of the first cover plate 234 is the top surface 231, a surface, away from the first cover plate 234, of the second cover plate 235 is the bottom surface 232, and the step surface 2333 is formed in an edge region of a surface, close to the first cover plate 234, of the second cover plate 235.

Referring to FIG. 1 to FIG. 15 together, an embodiment of the present invention further provides a method for assembling a housing assembly, where the method is used for forming the housing assembly 2 in the foregoing embodiment.

The method for assembling a housing assembly includes the following steps:

Step S01: Provide a frame body 21, where a bearing surface 211 and a limiting surface 212 are disposed on an inner side of the frame body 21.

Step S02: Dispense an adhesive 22 on the bearing surface 211.

Step S03: Provide a cover plate 23, where the cover plate 23 includes a top surface 231, a bottom surface 232, and a side surface 233 surroundingly connected between the top surface 231 and the bottom surface 232, and the side surface 233 includes a first side surface 2331 connected to the top surface 231 and a second side surface 2332 connected to the bottom surface 232.

Step S04: Install the cover plate 23 to the inner side of the frame body 21, where the bottom surface 232 is fastened to the bearing surface 211 by using the adhesive 22, the bottom surface 232 presses a part of the adhesive 22 to a clearance 2121 between the second side surface 2332 and the limiting surface 212, and accommodating space 2122 is formed between the first side surface 2331 and the limiting surface 212.

Step S05: Install a decorative ring 24 to the accommodating space 2122 and make the decorative ring 24 cover the bearing surface 211.

An order of step S01 and step S03 is not limited, and the two steps may be performed simultaneously, or one step may be performed after the other step. Step S02 is performed after step S01. Step S04 is performed after step S01, step S02, and step S03, and step S05 is performed after step S04.

In this embodiment, the decorative ring 24 can cover the bearing surface 211 after being installed, and therefore the decorative ring 24 also covers the adhesive 22. Therefore, according to the method for assembling a housing assembly, overflow of the adhesive 22 does not affect an appearance of the housing assembly 2, and even reliability of the housing assembly 2 can be improved by pressing a part of the adhesive 22 to the clearance 2121, so that an assembly process of the housing assembly 2 is simple with low difficulty, and the housing assembly has a high yield.

Further, according to the method for assembling a housing assembly, different manners of bonding the decorative ring 24 may be selected based on an overflow situation of the adhesive 22, so that assembly difficulty of the housing assembly is further reduced, and the yield of the housing assembly 2 is increased. Specifically:

the bottom surface 232 only presses a part of the adhesive 22 to the clearance 2121, that is, when the adhesive 22 is filled in the clearance 2121 and does not overflow onto the step surface 2333, after the adhesive 22 is cured, the decorative ring 24 is bonded to the step surface 2333 by using back glue 27.

When the bottom surface 232 concurrently presses the part of the adhesive 22 to the clearance 2121 and onto the step surface 2333, if a small amount of the adhesive 22 overflows onto the step surface 2333, after the adhesive 22 is cured, the decorative ring 24 is installed to the accommodating space 2122 and is bonded to the adhesive 22 by using the back glue 27; or if a large amount of the adhesive 22 overflows onto the step surface 2333, after the decorative ring 24 is installed to the accommodating space 2122 and is in contact with the adhesive 22, the adhesive 22 is cured.

It can be understood that in the method for assembling a housing assembly, a bonding manner of the decorative ring 24 and the step surface 2333 may be first designed, and an injection amount of the adhesive 22 is then appropriately set, so that a yield of the housing assembly 2 is improved.

What is claimed is:

1. A housing assembly, comprising:
    a frame body comprising a bearing surface and a limiting surface located on an inner side of the frame body;
    a cover plate comprising a top surface and a bottom surface opposite the top surface, wherein the cover plate further comprises a side surface surroundingly coupled between the top surface and the bottom surface, wherein the side surface comprises a first side surface coupled to the top surface and a second side surface coupled to the bottom surface, and wherein the cover plate is installed on the inner side of the frame body;
    an adhesive disposed between the bottom surface and the bearing surface and between the second side surface and the limiting surface, wherein an accommodating space is located between the first side surface and the limiting surface; and
    a decorative ring disposed in the accommodating space and covering the bearing surface.

2. The housing assembly of claim 1, wherein the frame body further comprises a boss formed on the bearing surface and spaced apart from the limiting surface, and wherein the boss is in contact with the bottom surface to prevent the adhesive from overflowing in a direction away from the limiting surface.

3. The housing assembly of claim 1, wherein the frame body further comprises a plurality of limiting bumps in contact with the second side surface and disposed at intervals along the limiting surface.

4. The housing assembly of claim 1, wherein the side surface further comprises a step surface coupled between the first side surface and the second side surface, wherein the accommodating space is enclosed by the step surface, the first side surface, and the limiting surface, and wherein the decorative ring is bonded to the step surface and is disposed in the accommodating space.

5. The housing assembly of claim 4, wherein the decorative ring is formed of a metal material, and wherein the decorative ring is in a clearance fit with the limiting surface and with the first side surface.

6. The housing assembly of claim 4, wherein the decorative ring is formed of a rubber material, and wherein the decorative ring is in an interference fit with the limiting surface and with the first side surface.

7. The housing assembly of claim 4, wherein the decorative ring is bonded to the step surface using back glue.

8. The housing assembly of claim 4, wherein the adhesive is further disposed on the step surface, and wherein the decorative ring is bonded to the adhesive using back glue to fasten the decorative ring onto the step surface.

9. The housing assembly of claim 5, wherein the adhesive is further disposed on the step surface, and wherein the decorative ring is bonded to the step surface using the adhesive.

10. The housing assembly of claim 4, wherein the cover plate further comprises;
    a first cover plate; and
    a second cover plate attached to the first cover plate in a stacked manner, wherein a first surface of the first cover plate that is disposed away from the second cover plate is the top surface, wherein a second surface of the second cover plate that is disposed away from the first cover plate is the bottom surface, and wherein the step surface is formed in an edge region of a third surface of the second cover plate that is disposed close to the first cover plate.

11. A mobile terminal, comprising:
a housing assembly comprising:
   a frame body comprising a bearing surface and a limiting surface located on an inner side of the frame body;
   a cover plate comprising a op surface and a bottom surface opposite the top surface, wherein the cover plate further comprises a side surface surroundingly coupled between she too surface and the bottom surface, wherein the side surface comprises a first side surface coupled to the top surface and a second side surface coupled to the bottom surface, and wherein the cover plate is installed on the inner side of the frame body;
   an adhesive disposed between the bottom surface and the bearing surface and between the second side surface and the limiting surface, wherein an accommodating space is located between the first side surface and the limiting surface; and
   a decorative ring disposed in the accommodating space and covering the bearing surface; and
a touchscreen installed on the inner side of the frame body and coupled to the bottom surface.

12. The mobile terminal of claim 1, wherein an orthographic projection of a display area of the touchscreen on the bottom surface coincides with an orthographic projection of the top surface on the bottom surface.

13. A method for assembling a housing assembly, comprising:
   providing a frame body comprising an inner side on which a bearing surface and a limiting surface are disposed;
   dispensing an adhesive on the bearing surface;
   providing a cover plate that comprises a top surface, a bottom surface, and a side surface surroundingly coupled between the top surface and the bottom surface, wherein the side surface comprises a first side surface coupled to the top surface and a second side surface coupled to the bottom surface;
   installing the cover plate on the inner side of the frame body by fastening the bottom surface to the bearing surface using the adhesive, wherein the bottom surface presses a part of the adhesive to a clearance between the second side surface and the limiting surface, and wherein installing the cover plate on the inner side of the frame body forms an accommodating space between the first side surface and the limiting surface;
   installing a decorative ring in the accommodating space; and
   making the decorative ring cover the bearing surface.

14. The method for assembling the housing assembly of claim 13, further comprising:
   curing the adhesive; and
   bonding the decorative ring to a step surface using back glue after the curing.

15. The method for assembling the housing assembly of claim 13, further comprising:
   simultaneously pressing, by the bottom surface, a portion of the adhesive onto the clearance and a step surface; and
   curing the adhesive after the decorative ring is installed on the accommodating space and is in contact with the adhesive.

16. The method for assembling the housing assembly of claim 13, further comprising:
   simultaneously pressing, by the bottom surface, a portion of the adhesive onto the clearance and a step surface;
   curing the adhesive;
   installing the decorative ring at the accommodating space after the curing; and
   bonding the decorative ring to the adhesive using back glue after the curing.

17. The housing assembly of claim 1, wherein the frame body further comprises a boss formed on the bearing surface and spaced apart from the limiting surface.

18. The housing assembly of claim 4, wherein the decorative ring is formed of a metal material.

19. The housing assembly of claim 4, wherein the decorative ring is formed of a rubber material.

20. The housing assembly of claim 19, wherein the decorative ring is bonded to the step surface using back glue.

* * * * *

UNITED STATES PATENT AND TRADEMARK OFFICE
CERTIFICATE OF CORRECTION

PATENT NO. : 10,567,563 B2  
APPLICATION NO. : 16/473528  
DATED : February 18, 2020  
INVENTOR(S) : Zaijun Qian Page 1 of 1

It is certified that error appears in the above-identified patent and that said Letters Patent is hereby corrected as shown below:

In the Claims

Claim 11, Column 15, Line 9: "a op surface" should read "a top surface"

Claim 11, Column 15, Line 12: "between she too surface" should read "between the top surface"

Claim 12, Column 15, Line 27: "of claim 1" should read "of claim 11"

Signed and Sealed this  
Fifth Day of May, 2020

Andrei Iancu  
*Director of the United States Patent and Trademark Office*